Sept. 19, 1944.　　　J. E. BATY　　　2,358,296
OPTICAL APPARATUS FOR MEASURING, GAUGING AND THE LIKE
Filed July 6, 1942　　　5 Sheets-Sheet 1

Inventor:
J. E. Baty.
By Young, Emery & Thompson
Attys.

Inventor
J. E. Baty
By Young, Emery & Thompson
Attys

Sept. 19, 1944.                J. E. BATY                 2,358,296
         OPTICAL APPARATUS FOR MEASURING, GAUGING AND THE LIKE
                    Filed July 6, 1942        5 Sheets-Sheet 3

Inventor.
J. E. Baty
By
Young, Emery & Thompson
Attys.

Sept. 19, 1944. J. E. BATY 2,358,296
OPTICAL APPARATUS FOR MEASURING, GAUGING AND THE LIKE
Filed July 6, 1942 5 Sheets-Sheet 5

Inventor:
J. E. Baty
By
Young, Emery & Thompson
Attys.

Patented Sept. 19, 1944

2,358,296

UNITED STATES PATENT OFFICE 2,358,296

OPTICAL APPARATUS FOR MEASURING, GAUGING, AND THE LIKE

James Elphinstone Baty, Sidcup, England

Application July 6, 1942, Serial No. 449,926
In Great Britain August 25, 1941

18 Claims. (Cl. 88—24)

This invention relates to optical apparatus for measuring, gauging, testing, comparing, and otherwise examining, the shape of at least two configurations by optical projection of these configurations on an enlarged scale on a screen in juxtaposition or apparent inter-engaging positions for comparison with each other or in suitable positions for comparison with a scale or with other similar configurations previously drawn on the screen, or simultaneously projected on to the screen.

The two shapes to be examined may be formed on the same part, for example opposite sides of a screw, or on different parts, for example the shape of one side of a screw and the shape of one side of a master gauge or other setting piece.

The invention relates more particularly but not solely to apparatus known as optical screw-thread projectors for projection of the images of opposite sides of a screw-thread on to a screen for comparison with a master setting piece previously or simultaneously projected or with an enlarged drawing of the master gauge thread on the screen. For example, the images of both sides of the thread will be reversed so as to appear on the screen in apparent engagement with each other, i. e. the images appear to have inter-engaging teeth. If the apparatus is adjusted so that the images from the opposite sides of the setting piece appear to engage accurately and the setting piece is then removed from the apparatus and replaced by the screw to be examined, the threads of the latter if accurate will equally appear to engage but inaccuracies of diameter pitch and angle of thread will readily be observed and with known magnification can be measured.

One object of the invention is to provide an apparatus in which the images of two shapes disposed at various distances close together, e. g. on the opposite sides of screw threads of small diameters, can be projected on to a screen.

This is accomplished in accordance with the present invention by providing at least two pairs of reflecting surfaces between the work and the projection lens and in such positions that each pair is parallel and these surfaces receive and emit two beams in parallel planes which as received and emitted are closer together than twice the length of one beam between one pair of said reflecting surfaces. This can be effected according to one arrangement by supporting reflecting devices in positions in which four reflecting surfaces are parallel and at an angle to four other parallel surfaces and all the surfaces are so disposed that two parallel beams of light are reflected first into opposite directions, then into the same direction, then towards each other, and finally in the original direction through the said projection lens. The said surfaces and planes are not always precisely parallel as adjustments can be made for various purposes and the term "parallel" in the specification and claims is intended to include the relative dispositions slightly out of parallelism required for purposes of adjustments.

The simultaneous projection of opposite sides of screws of large diameters would normally involve very large projection lenses which would be costly and if refraction occurs through the lens outside a comparatively small central area of the lens, the images will be imperfectly produced. To avoid this difficulty it has heretofore been proposed to split the projection lens diametrically and to provide means for separating the two halves of the lens to accommodate different diameters of screws whilst still ensuring that refraction of the light rays will occur through the central part of each half-lens. The production of these half-lenses, however, involves a high order of craftsmanship, lengthy period of production, and consequential increase of cost. Accordingly, another object of the invention is to enable the above described reflecting devices to be readily changed into a system in which the reflecting surfaces receive the beams in parallel planes wider apart than twice the said length but emit the beams in planes close together for passing through the central part of a normal (not split) projection lens, so that the apparatus is readily changeable to deal with a range of large and of small sizes of work or distances between the beams without using a split lens.

Another object of the invention is to provide simple means for projecting the required beams in parallel planes at different distances apart to suit different sizes of work and this is effected by providing a pair of reflecting surfaces which may be normal back silvered mirrors which are adjustable towards each other and apart for different sizes of work. For examining screw-threads these reflecting surfaces may be adjustable for raking the beams at the required opposite angles of the threads on opposite sides of the screw.

A still further object of the invention is to enable the apparatus to deal with various sizes of work without requiring a series of master gauges for each size and for this purpose I employ a form-gauge which is of the correct required shape but not of the required size and I project the beams in parallel planes one over the form-gauge and the other over the workpiece and provide for suitable adjustment preferably including adjustment of the form-gauge and workpiece transversely across the paths of the beams so that the beams project images of different sizes of workpiece with the same form-gauge.

The above and other objects and features of the invention will now be described with reference to the apparatus illustrated by way of example in the accompanying diagrammatic drawings wherein.

Figure 1:
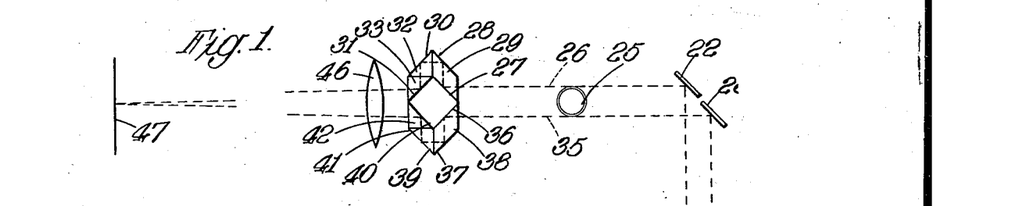
Figure 1 shows a gauging apparatus made in accordance with the invention.

In the arrangement shown in Figure 1, a source of illumination 20 consists of an arc lamp or a bunched filament lamp. The beam from this light source passes through a fixed condenser lens 21 to obtain a parallel beam. This parallel beam is divided by two suitably mounted reflecting devices comprising normal back silvered mirrors 22, 23, although prisms or other reflectors can be used. The mirrors are at an angle of 45° to the directions of the incident and reflected light and offset from each other in both of these directions. The reflected beams are at right angles to the parallel beam. The mirrors are arranged to be adjustable towards and away from each other in the direction parallel to the incident beams to produce reflected beams at the required distances apart to suit different sizes of work from the smallest to the greatest for which the apparatus is designed.

Figure 2:
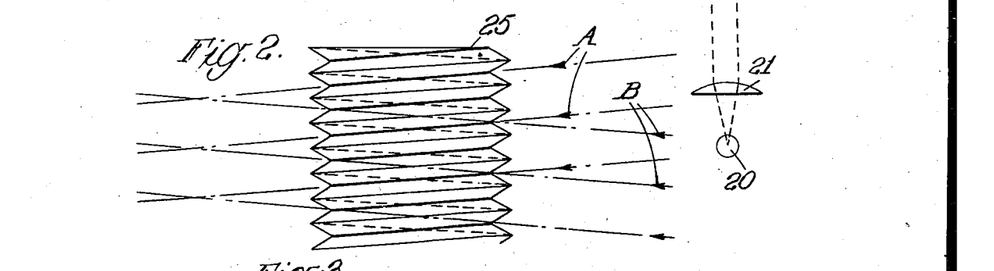
Figure 2 is a view of part of a screw illustrating the raking of the light beams along the opposite angles of the thread on opposite sides of the screw.
Figures 3, 4, 5, 6:
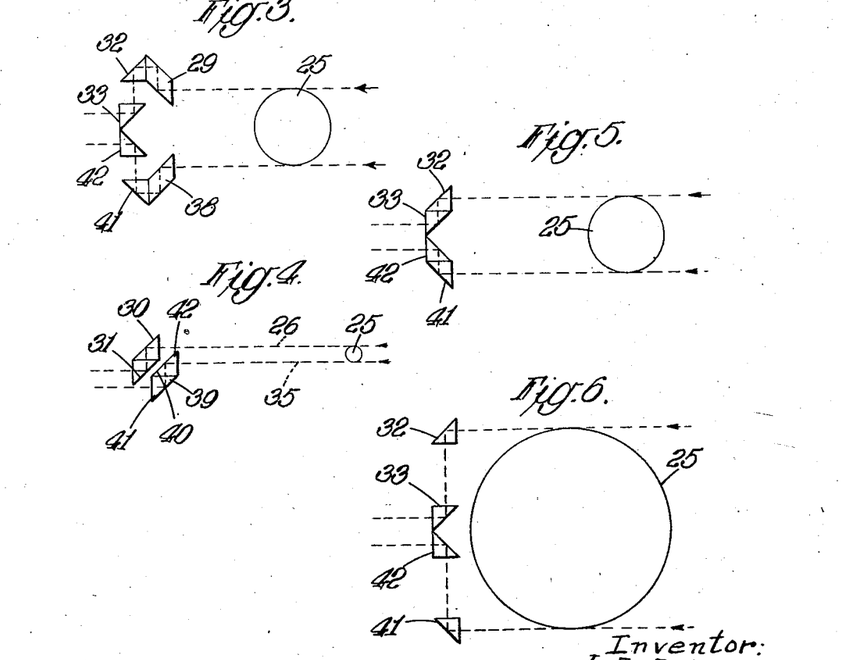
Figure 3 shows the prismatic means of the apparatus adjusted for dealing with somewhat larger work.
Figure 4 shows a modified arrangement of the gauging apparatus.
Figure 5 shows the prismatic means after a change has been made for dealing with still larger work.
Figure 6 shows the prismatic means of Figure 4 adjusted for dealing with quite large size work.
Figure 7:
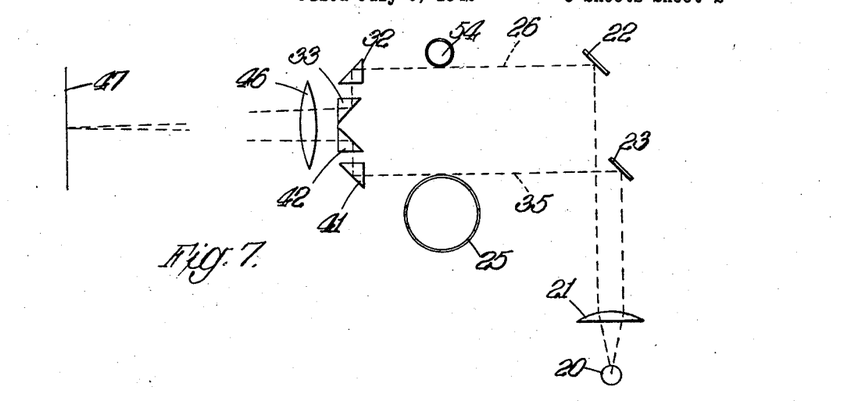
Figure 7 illustrates the application of the invention to a novel method of examining screws of various diameters without the use of master gauges.
Figure 8:
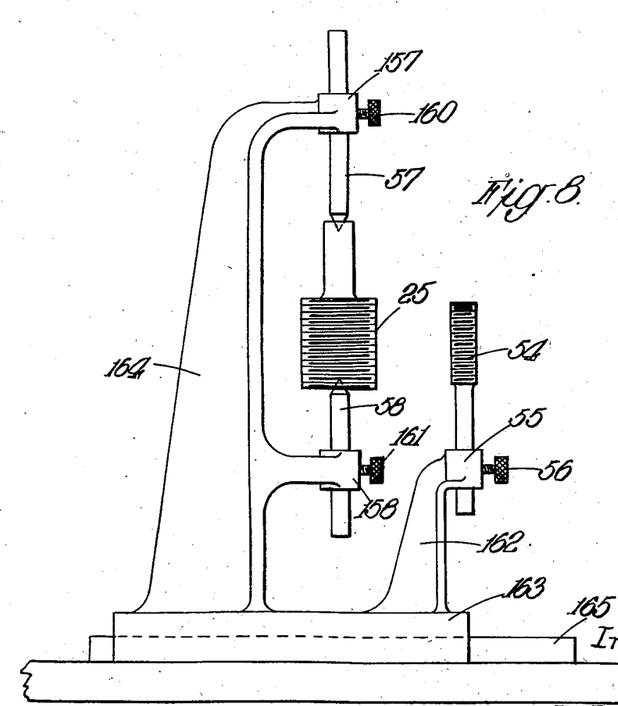
Figures 8, 9 and 10 show constructional details for use in the apparatus shown in Figure 7.

The mirrors are also adjustable for taking the beams to the opposite angles (indicated by the arrows A, B, in Figure 2) of the screw threads on opposite sides of the screw so that although they are still in parallel planes they are at opposite angles to each other. The reflected beams pass over the opposite sides of the screw 25 to be tested and are then reflected by prismatic means comprising two pairs of triangular prisms and two rhomboidal prisms. The beam 26 is reflected by the reflecting surfaces 27, 28, of the rhomboid 29, and by the reflecting surfaces 30, 31 of the two triangular prisms 32 and 33 respectively. The beam 35 is reflected by the reflecting surfaces 36, 37, of the rhomboid 38, and by the reflecting surfaces 39, 40, of the triangular prisms 41, 42 respectively. The four surfaces 27, 28, 40, 41, are parallel (except for possible slight adjustment above referred to) and at an angle to the other four surfaces. The beams 26, 35, are reflected first into opposite directions by the surfaces 27, 36; then into the same direction by the surfaces 28, 37, then towards each other by the surfaces 30, 39; and finally into the original direction again by the surfaces 31, 40. The beams on both sides of these prismatic means can be spaced apart a distance not only less than twice the length of a beam between a pair of parallel surfaces, e. g. 27, 28, but in fact less than once this length, so that the beams can be close together without using unusually small sizes of prisms. The rhomboid 29 and triangular prism 32 in unison on the one hand, and the rhomboid 38 and triangular prism 41 in unison on the other, can be adjusted towards and away from each other to accommodate various sizes of work whilst maintaining the lengths of the beams equal. Thus, Figure 3 shows the prisms adjusted to accommodate larger work. One or more of the prisms can also be adjusted for varying the angular disposition of the projected images and one or more prisms can be adjusted for bringing the images towards or away from each other or into any other desired position. If desired, each pair of prisms 29, 32 and 38, 41 can be made integral. The beams after passing through the reflecting means are projected through a projection lens 46 on to a screen 47 where they may be observed in apparent interengagement with each other or with a drawing on the screen. The apparatus is first set with a master gauge in the position 25 and thereafter successive pieces of work 25 are inserted and their accuracy or lack of accuracy observed on the screen. Focussing of the images and bringing them into required dispositions will be effected by adjusting the prisms and work; for this purpose the work may be adjusted in the direction of the beams.

In the arrangement shown in Figure 4, the rhomboidal prisms have been removed and the triangular prisms 41, 42 of Figure 1 are reversed so that the reflecting surfaces 30, 31, 39, 40, are all parallel, so as to be offset from each other transversely of the projection direction. The prisms receive the parallel beams from the workpiece 25 on to the surfaces 30, 40, which reflect the beams into the same direction on to the other two surfaces 31, 39, which reflect them both back into the original direction. In this arrangement also the beams on both sides of the prisms can be not only closer together than twice the length of one beam between two reflecting surfaces, e. g. 30, 31, but even closer together than the length of one beam between these surfaces.

The apparatus is constructed so that the arrangement of Figure 1 can be readily changed over to the system shown in Figures 5 and 6 for dealing with work of large sizes. The arrangement of Figure 1 can be used without change for large sizes but the change is desirable to reduce loss of light particularly as this change is effected simply by removing the rhomboidal prisms. The change from the arrangement of Figure 4 is effected by reversing the prisms 41, 42. The prismatic system as shown in Figures 5 and 6 can only deal with sizes of work greater than the combined transverse components of the beams, i. e. twice the length of one beam between the reflecting surfaces 30, 31. The prisms 32, 41, are adjustable towards and away from each other to accommodate different sizes of work. The smallest size is shown in Figure 5 and the prisms adjusted for dealing with a larger size are shown in Figure 6.

Figures 9, 10, 11:
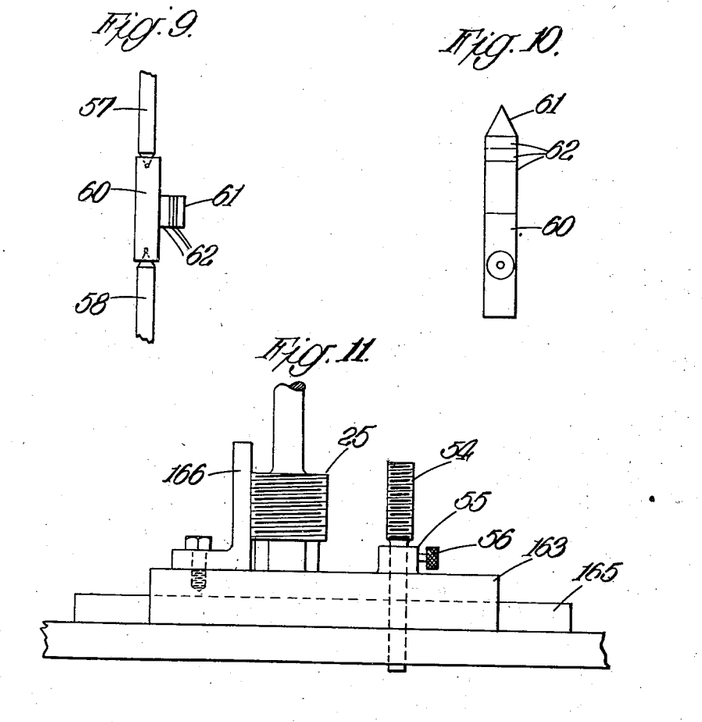
Figures 11 and 12 show alternative constructional details for use in the apparatus shown in Figure 7.
Figure 12:
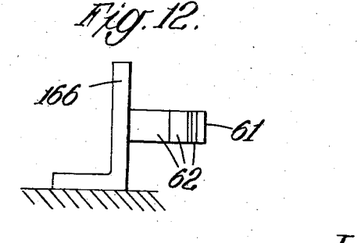

The apparatus may be constructed in such a manner as to enable the apparatus to be set up and used for work of various sizes without the use of a master gauge which is made accurately for both size and shape (e. g. diameter, pitch and form of screws) and this represents a considerable saving in cost and time. For this purpose the novel method and apparatus illustrated in Figures 7 to 12 is used. In place of a master gauge, I use a form-gauge shown at 54 which, for screw testing, is a thread ground cylinder of the correct pitch and form but a single form-gauge is used for screws of any diameter having the same shape (pitch and form). The form-gauge is adjustably mounted in supporting means which, in the example shown, comprises a boss 55 carrying the shank of the form-gauge which is held in position by a screw 56. The work 25 is mounted on centres 57, 58, carried adjustably in bosses 157, 158, and held in adjusted position therein by screws 160, 161. The boss 55 is mounted on a standard 162 carried by a slide 163 which also carries a standard 164 on which the bosses 157, 158, are mounted. The slide is adjustable on a V guideway 165, in the direction transversely to the direction of the beams passing over the work and form-gauge so that these are adjusted simultaneously in this direction for centralising them about the optical axis of the apparatus. The form gauge and work are mounted on opposite sides of the beams 26, 35, so that the latter reflected from the mirrors 22, 23, pass over the most nearly adjacent generatrices of the form gauge and work. The apparatus can, however, be arranged so that the work and form gauge are between the beams which then pass over the most widely spaced generatrices. For setting for a different size, the work 25 is replaced by a hardened plate 60 (Figures 9 and 10), the top face of which is lapped parallel to and a known distance from the axis of the centres. A knife edge 61 and suitable slip gauges 62 are now placed on the plate 60 (and remain in position by adhesion in the known manner) to make the distance between the upper edge of the knife edge and the axis of the centres 57, 58, equal to the radius of the new size required. Adjustment is then made to produce the required comparison of the images on the screen, e. g. to bring the image of the knife edge into coincidence with a generatrix of the minor diameter of the form-gauge. The prismatic means shown in any of Figures 1 to 6 may replace those shown in Figure 7. Instead of supporting the work on centres, it can be placed on the slide 163 against an adjustable stop 166, as shown in Figure 11, and the slip gauge 62 and knife edge 61 can be wrung on to the stop 166 as shown in Figure 12. When the apparatus has been set, the plate 60, slip gauges 62, and knife edge 61, are removed, and the successive pieces of work mounted on the centres 57, 58, and examined on the screen not only for form and pitch but also for diameter. Rotation of the work or form-gauge will serve to adjust the images to bring the crests of one into alignment with the depressions of the other whereby the adjustment of prisms or other reflecting devices for this purpose can be avoided.

The constructional details of the apparatus for supporting and adjusting the various parts can be designed in innumerable different ways, but by way of example one constructional form will now be described with reference to Figures 13 to 19.

Figure 13:
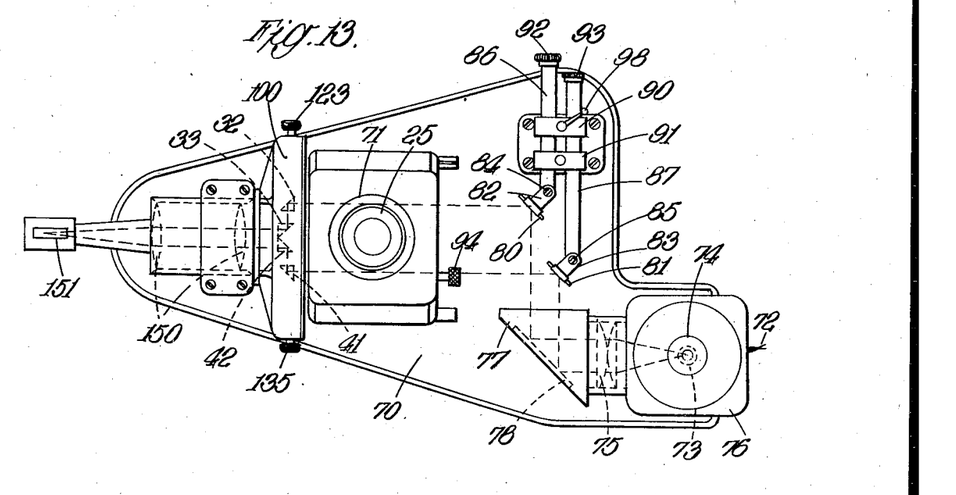
Figure 13 is a plan view of a practical constructional form of apparatus made in accordance with the invention.

A base casting 70 carries a horizontal table 71 on which the work can be placed, and suitable tilting or levelling and raising and lowering screws can also be provided if desired. The levelling screws can be used for giving any required tilt to the table for bringing the images into mesh on the screen. The table can also be traversed for focussing along the direction of the beams passing over the work, by a screw 94. An electric cable 72 is provided for attachment to the electric mains and this cable is connected to an electric lamp holder 73 which holds the lamp 74. The lamp and the condenser lens 75 are mounted in a housing 76 which carries a mounting 77 for a 45° reflecting reflector 78 that reflects the beam from the lamp 74 at right angles on to two ordinary back-silvered mirrors 80, 81. These mirrors are carried in clamps 82, 83, that are attached by screws 84, 85, to rods 86, 87 respectively. The rods 86, 87, are mounted in split bearing blocks 90, 91, and having knurled knobs 92, 93, on their ends by which the operator can adjust them axially and rotatably.

Figure 14:
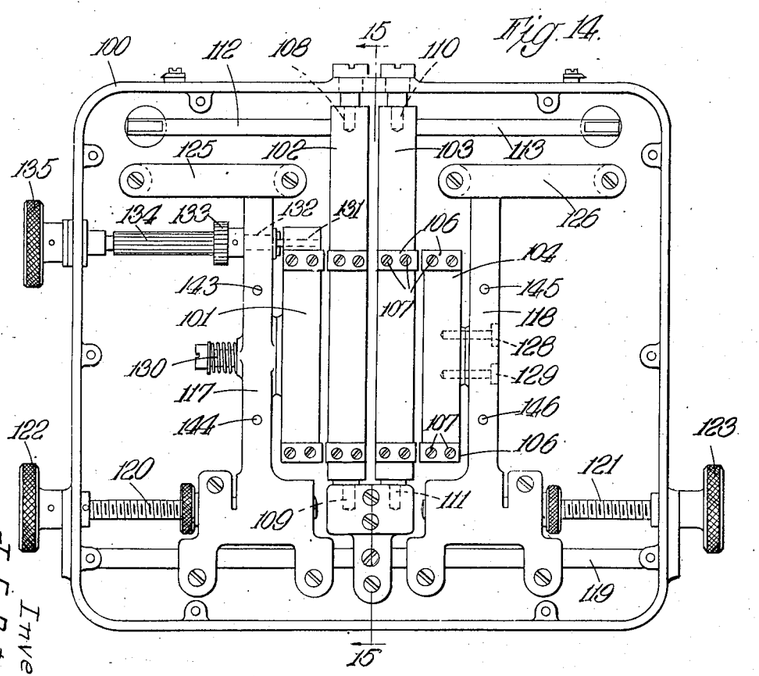
Figure 14 is a view of part of the apparatus shown in Figure 13 but looking in the direction of projection.
Figure 15:
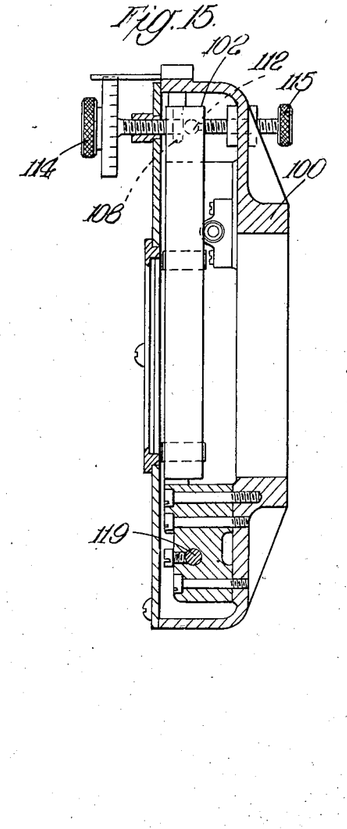
Figure 15 is a sectional view on the line 15—15 on Figure 14.
Figure 16:
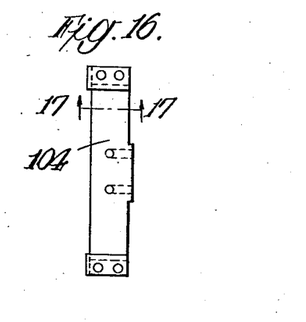
Figure 16 is an enlarged view of a detail shown in Figure 14.
Figure 17:
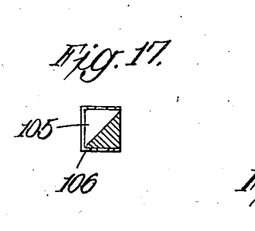
Figure 17 is a sectional view on the line 17—17 on Figure 16.

After adjustment the rods are fixed in position by clamping the parts of the bearing 90 together by means of a clamping nut having a short handle 98. The light beams from the mirror pass over the work into the prismatic system that is mounted in a casing 100. The prisms 32, 33, 41, 42, (not shown in Figures 14 to 17) are mounted on supporting means comprising four vertical bars 101, 102, 103, 104, respectively. The bars are all of the cross-sectional shape shown in Figure 17, viz. triangular at one part and at each end of the triangular portion they are of the full square shape. The prisms fit snugly into the positions indicated by the triangle 105 in Figure 17 and are clamped in position by hands 106 that are attached to the bars by screws 107 (Figure 14). The bars 102, 103, are mounted on vertical trunnion pins 108, 109, and 110, 111, respectively so that they can be adjusted about the vertical axes of these trunnion pins for adjusting the images towards and away from each other. For effecting this adjustment, the bars 102, 103, carry fixed rods 112, 113, the outer ends of which can be adjusted each by a pair of screws of which one pair 114, 115, are shown in Figure 15. The bars 101, 104, are mounted respectively on vertical supports 117, 118, which in turn are mounted on a rod 119 along which they are independently adjustable by screws 120, 121, actuated by knobs 122, 123, whereby the prisms 32, 41, can be adjusted for accommodating different sizes of work. The upper ends of the supports 117, 118, are guided by guide bars 125, 126. The prism supporting bar 104 is attached to its support 118 by two screws 128, 129. The bar 101, however, is pivotally mounted on a spindle 130, carried by the support 117, and is adjustable by tilting around this spindle for bringing the images into parallelism. For effecting this adjustment, a cylindrical pin 131 fits in an aperture in the upper end of the bar 101 and this pin is carried eccentrically in a spindle 132 that carries a pinion 133 engaged by a long pinion or splined rod 134 rotatable by a knurled knob 135. For applying the rhomboidal prisms 29, 38, holders for these prisms are attachable to the vertical supports 117, 118, so as to have the same lateral adjustments as the prisms 32, 41.

Figure 18:
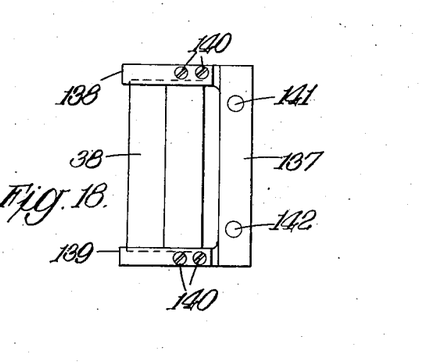
Figures 18 and 19 show in elevation and plan respectively a prism holder for attachment to the apparatus shown in Figures 13 to 17.
Figure 19:
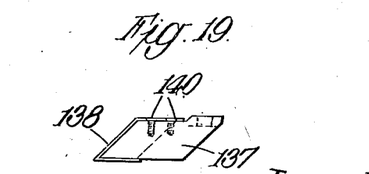

One of the holders is shown in Figures 18 and 19. The prism is held in the holder 137 by bands 138, 139, attached by screws 140. The holder is mounted by screws that pass through holes 141, 142, in the holder and screw into threaded holes 143, 144, and 145, 146 in the vertical supports 117, 118.

The beams of light leaving the prismatic system pass through a compound or simple projection lens 150 and are then reflected by a prism 151 up to a reflector not shown but arranged several feet above the apparatus whence the beams are reflected down to a screen also not shown but placed in a position convenient to the operator.

If desired, other prisms may be provided for bringing the images together or into palallelism on the screen instead of adjusting the prisms shown to effect these movements.

If desired, the image of one or more configurations can be projected on to a screen carrying a chart or drawing of the accurate shape of master screw or other configuration with an adjacent area the width of which corresponds to the allowable tolerance and which area may have a depth of colour (for example blue or grey) equal to that of the projected image so that oversize or undersize of the object may be shown by darker or lighter shades caused by the image overlapping the area or being spaced from it.

I claim:

1. Optical gauging apparatus having means for supporting parts having shapes to be examined, means for directing two beams of light in parallel planes simultaneously one over each of two such shapes, a projection lens for focussing images of said shapes on to a screen, supporting means adapted to support reflecting devices between said shapes and said projection lens in such positions that at least two pairs of reflecting surfaces each pair being approximately parallel are disposed so as to receive and emit beams in parallel planes which are closer together than twice the length of one beam between one pair of said reflecting surfaces, and means for adjusting said supporting means to vary the relative dispositions of the reflecting devices and thereby accommodate different distances apart of the beams on one side of said reflecting devices, viz., the side near the said shapes, without varying the distance apart of the beams on the other side of said devices.

2. Optical gauging apparatus having means for supporting parts having shapes to be examined, means for directing two beams of light in parallel planes simultaneously one over each of two such shapes, a projection lens for focussing images of said shapes on to a screen, supporting means adapted to support reflecting devices between said shapes and said projection lens in such positions that at least two pairs of reflecting surfaces each pair being approximately parallel are disposed so as to receive and emit beams in parallel planes which are closer together than twice the length of one beam between one pair of said reflecting surfaces, and means for adjusting said supporting means to vary the relative dispositions of the reflecting devices and thereby accommodate different distances apart of the beams on one side of said reflecting devices, viz., the side near the said shapes, without varying the distance apart of the beams on the other side of said devices.

3. Optical gauging apparatus having means for supporting parts having shapes to be examined, means for directing two beams of light in parallel planes simultaneously one over each of two such shapes, a projection lens for focussing images of said shapes on to a screen, supporting means adapted to support reflecting devices between said shapes and said projection lens in such positions that at least two pairs of reflecting surfaces each pair being approximately parallel are disposed so as to receive and emit beams in parallel planes which are closer together than twice the length of one beam between one pair of said reflecting surfaces, means for adjusting the reflecting devices for moving the images towards and away from each other on the screen, and means for adjusting said supporting means to vary the relative dispositions of the reflecting devices and thereby accommodate different distances apart of the beams on one side of said reflecting devices, viz., the side near the said shapes, without varying the distance apart of the beams on the other side of said devices.

4. Optical gauging apparatus having means for supporting parts having shapes to be examined, means for directing two beams of light in parallel planes simultaneously one over each of two such shapes, a projection lens for focussing images of said shapes on to a screen, supporting means adapted to support reflecting devices between said shapes and said projection lens in such positions that at least two pairs of reflecting surfaces each pair being approximately parallel are disposed so as to receive and emit beams in parallel planes which are closer together than twice the length of one beam between one pair of said reflecting surfaces, means for adjusting the reflecting devices for bringing the images into parallelism on the screen, and means for adjusting said supporting means to vary the relative dispositions of the reflecting devices and thereby accommodate different distances apart of the beams on one side of said reflecting devices, viz., the side near the said shapes, without varying the distance apart of the beams on the other side of said devices.

5. Optical gauging apparatus having means for supporting parts having shapes to be examined, means for directing two beams of light in parallel planes simultaneously one over each of two such shapes, a projection lens for focussing images of said shapes on to a screen, and supporting means adapted to support reflecting devices between said shapes and said projection lens in such position that at least two pairs of reflecting surfaces each pair being parallel are disposed so as to receive and emit beams in parallel planes which are closer together than twice the length of one beam between one pair of said reflecting surfaces, means for adjusting the reflecting devices for moving the images towards and away from each other on the screen and for bringing the images into parallelism on the screen and for accommodating different distances apart of the beams, and means for adjusting said supporting means to vary the relative dispositions of the reflecting devices and thereby accommodate different distances apart of the beams on one side of said reflecting devices, viz., the side near the said shapes, without varying the distance apart of the beams on the other side of said devices.

6. Optical gauging apparatus having means for providing for the emission of a light beam from a single lamp, means for supporting shaped parts required to be examined, two reflecting devices adapted to reflect said light beam in two beams in parallel planes over the said shapes, means for adjusting said devices towards each other and apart in the direction of the incident beam so as to vary the distance apart of the said two reflected beams to suit different distances apart of said shapes, a projection lens for focussing images of said shapes on to a screen, supporting means adapted to support reflecting devices between said shapes and said projection lens in such positions that at least two pairs of reflecting surfaces each pair being parallel are disposed so as to receive and emit beams in parallel planes which are closer together than twice the length of one beam between one pair of said reflecting surfaces, and means for adjusting said supporting means to vary the relative dispositions of the reflecting devices and thereby accommodate different distances apart of the beams on one side of said reflecting devices, viz., the side near the said shapes, without varying the distance apart of the beams on the other side of said devices.

7. Optical gauging apparatus having means for supporting parts having shapes to be examined, means for directing two beams of light in parallel planes simultaneously one over each of two such shapes, a projector lens adapted to focus images of said shapes on to a screen, supporting means adapted to support reflecting devices between said shapes and said projection lens in positions in which four reflecting surfaces are parallel and at an angle to four other parallel surfaces and all the surfaces are so disposed that two beams in parallel planes are reflected first into opposite directions, then into the same direction, then towards each other, and finally in the original direction through the said projection lens, and means for adjusting said supporting means to vary the relative dispositions of the reflecting devices and thereby accommodate different distances apart of the beams on one side of said reflecting devices, viz., the side near the said shapes, without varying the distance apart of the beams on the other side of said devices.

8. Optical gauging apparatus having means for supporting parts having shapes to be examined, means for directing two beams of light in parallel planes simultaneously one over each of two such shapes, a projector lens adapted to focus images of said shapes on to a screen, supporting means adapted to support reflecting devices between said shapes and said projection lens in positions in which four parallel reflecting surfaces receive two beams in parallel planes on two of said surfaces which reflect them into approximately the same direction on to the other two surfaces which reflect them into approximately the same direction and through the said projection lens, and means for adjusting said supporting means to vary the relative dispositions of the reflecting devices and thereby accommodate different distances apart of the beams on one side of said reflecting devices, viz., the side near the said shapes, without varying the distance apart of the beams on the other side of said devices.

9. Optical gauging apparatus having means for supporting parts having shapes to be examined, means for directing two beams of light in parallel planes simultaneously one over each of two such shapes, a projection lens for focussing images of said shapes on to a screen, means for supporting two pairs of prisms so that the prisms of one pair reflect one beam of light the prisms of the other pair reflect another beam of light and the two reflecting surfaces of one pair are approximately parallel and at an opposite angle to the other pair, the prisms being arranged so that the beams on one side only are closer together than twice the length of one beam between two reflecting surfaces, means for adjusting the outer prisms towards and away from each other to accommodate different sizes of work, and means for supporting one pair of prisms in reversed positions so that all the reflecting surfaces are parallel and so that the beams on both sides of the prisms are in parallel planes which are closer together than twice the length of one beam between two reflecting surfaces.

10. Optical gauging apparatus having means for supporting parts having shapes to be examined, means for directing two beams of light in parallel planes simultaneously one over each of two such shapes, a projection lens for focussing images of said shapes on to a screen, means for supporting two pairs of prisms so that the prisms of one pair reflect one beam of light and the prisms of the other pair reflect another beam of light and the two reflecting surfaces of one pair are parallel and at an opposite angle to the other pair, the prisms being arranged so that the beams on one side only are in parallel planes which are closer together than twice the length of one beam between two reflecting surfaces, and means to support a pair of rhombs in the line of the beams in such positions that the beams on both sides of the prismatic system comprising the prisms and rhombs are in parallel planes which are closer together than twice the length of one beam.

11. Optical gauging apparatus having means for providing for the emission of a light beam from a single lamp, means for supporting shapes required to be compared, two reflecting devices adapted to reflect said light beam in two beams in parallel planes over the said shapes, means for adjusting said devices towards each other and apart so as to vary the distance apart of said shapes, a projection lens for focussing images of said snapes on to a screen, supporting means adapted to support reflecting devices between said shapes and said projection lens in such positions that at least two pairs of reflecting surfaces each pair being parallel are disposed so as to receive and emit the beams in parallel planes which are closer together than twice the length of one beam between one pair of said reflecting surfaces, and means for adjusting said supporting means to vary the relative dispositions of the reflecting devices and thereby accommodate different distances apart of the beams on one side of said reflecting devices, viz., the side near the said shapes, without varying the distance apart of the beams on the other side of said devices.

12. Optical gauging apparatus having means for supporting parts having shapes to be examined, means including an object lens for directing two beams of light in parallel planes simultaneously one over each of two such shapes, a projection lens for focussing images of said shapes on to a screen, supporting means adapted to support reflecting devices between said shapes and one of said lenses in such positions that at least two pairs of reflecting surfaces each pair being approximately parallel are disposed so as to receive and emit beams in parallel planes which are closer together than twice the length of one beam between one pair of said reflecting surfaces, and means for adjusting said supporting means to vary the relative dispositions of the reflecting devices and thereby accommodate different distances apart of the beams on one side of said reflecting devices viz., the side near the said shapes, without varying the distance apart of the beams on the other side of said devices.

13. Optical gauging apparatus having means for providing for the emission of a light beam from a single lamp, means for supporting shaped parts required to be examined, two substantially parallel reflecting devices offset from each other in the directions both of the incident and reflected light and adapted to reflect said light beam in two beams in a direction approximately at right angles to the beams as received in parallel planes over the said shapes, means for adjusting said devices towards each other and apart in the direction transversely of the reflected beams to suit different distances apart of said shapes, and means for projecting the beams on to a screen.

14. Optical gauging apparatus having means for providing for the emission of a light beam from a single lamp, means for supporting shaped screw-threaded parts required to be examined, two substantially parallel reflecting devices, offset from each other in the directions both of the incident and reflected light and adapted to reflect said light beam in two beams in a direction approximately at right angles to the beams as received in parallel planes over the said shapes, means for adjusting said devices for raking said two beams to the angles of the screw-threads at said parts and for moving said devices towards each other and apart in the direction transversely of the reflected beams to suit different distances apart of said shapes, and means for projecting the beams on to a screen.

15. Optical gauging apparatus having means for providing for the emission of a light beam from a single lamp, means for supporting shapes required to be examined, two substantially parallel reflecting devices offset from each other in the directions both of the incident and reflected light and adapted to reflect said light beam in two beams in a direction approximately at right angles to the beams as received in parallel planes over the said shapes, means for adjusting said devices towards each other and apart in the direction transversely of the reflected beams to suit different distances apart of said shapes, a projection lens for focussing images of said shapes on to a screen, and supporting means adapted to support reflecting devices between said shapes and said projection lens in such positions that at least two pairs of reflecting surfaces each pair being parallel are disposed so as to receive and emit beams in parallel planes which are closer together than twice the length of one beam between one pair of said reflecting surfaces.

16. Optical gauging apparatus comprising means including a light source for projecting two beams of light in parallel planes, means for projecting images on to a screen, means for adjusting the paths of the beams to bring the images on to a screen into required dispositions, means to support a form-gauge in the one of said beams, means to support a work-piece in the other of said beams, means for effecting relative movement between said beams and form-gauge and work-piece to centralize said configurations in relation to the adjacent parts of said beams, such movement being adapted to enable the configurations of work-pieces which are otherwise of different sizes to be compared with the configuration of a single size of form-gauge, a projection lens for focussing images of said shapes on to the screen, and supporting means adapted to support reflecting devices between said shapes and said projection lens in such positions that at least two pairs of reflecting surfaces each pair being parallel are disposed so as to receive and emit beams in parallel planes which are closer together than twice the length of one beam between one pair of said reflecting surfaces.

17. Optical gauging apparatus comprising means including a light source for projecting two beams of light in parallel planes, means for projecting images on to a screen, means for adjusting the paths of the beams to bring the images on to a screen into required dispositions, means to support a form-gauge in one of said beams so that the beam passes over one side of the form-gauge, means to support a work-piece in the other of said beams so that the beam passes over one side of the work-piece, means for effecting relative movement between said beams and form-gauge and work-piece to centralize said configurations in relation to the adjacent parts of said beams, such movement being adapted to enable the configurations of work-pieces which are otherwise of different sizes to be compared with the configuration of a single size of form-gauge, and a projection lens for focussing images of said shapes on to the screen.

18. Optical gauging apparatus having means for supporting parts having shapes to be examined, means for directing two beams of light in parallel planes simultaneously one over each of two such shapes, a projection lens for focussing images of said shapes on to a screen, and means for supporting two prismatic systems in different positions, said systems comprising two pairs of reflecting surfaces wherein in one position two pairs of reflecting surfaces having the surfaces of each pair parallel are disposed so as to receive and emit two beams of light in parallel planes which on one side are spaced apart a distance greater than twice the length of the beam between a pair of said reflecting surfaces and in the other position at least two pairs of reflecting devices having the surfaces of each pair parallel are disposed so as to receive and emit two beams of light in parallel planes which on both sides are closer together than twice the length of one beam between one pair of said reflecting surfaces.

JAMES ELPHINSTONE BATY.